Patented Nov. 23, 1943

2,334,812

UNITED STATES PATENT OFFICE 2,334,812

PROCESS FOR THE PREPARATION OF ORGANIC PIGMENTS

Stanley R. Detrick and Carl R. Brandt, Wilmington, Del., assignors to E. I. du Pont de Nemours & Company, Wilmington, Del., a corporation of Delaware No Drawing. Application February 23, 1940, Serial No. 320,418

15 Claims. (Cl. 260—314)

This invention relates to an improved process for the preparation of organic pigments and water insoluble organic color compounds in an extremely fine state of sub-division. The invention relates more particularly to the preparation of organic pigments which exhibit improved tinctorial strength and brilliance over the similar compounds when prepared by the processes described in the prior art.

It is well known that water insoluble organic pigments when dissolved in the acids usually employed for the acid pasting of dyestuffs can be precipitated in crystalline form by diluting the acid solution of such dyestuff with water. Where the dilution is carried out slowly the color compound is obtained in the form of large crystals which are of little or no value for use as pigments. In the manufacture of organic pigments it has therefore been the aim to precipitate the pigments from the acid solution by the process generally referred to as "drowning." The drowning is normally effected by running the acid solution of the color compound into a relatively large volume of water through a small pipe, a perforated pipe, or a spray head, while the water is being agitated in the drowning tub. The pigments obtained by these conventional methods of drowning exhibit much improved properties over those obtained by the slow dilution methods. In general, these pigments have been considered as representing the ultimate in strength and brilliance that could be obtained from the particular color compounds. Even where the acid solution of the dyestuff is run in an extremely fine spray into the drowning bath under agitation a sufficient interval of time exists during which the acid solution of the dyestuff is being reduced in concentration to a strength wherein the dye is no longer soluble in the acid that appreciable crystal growth occurs.

It is an object of the present invention to precipitate dyestuffs or color compounds from acid solutions in an extremely fine state of sub-division by effecting dilution of the acid solutions under conditions which prevent crystal growth.

It is a further object of the invention to prepare organic pigments which exhibit increased tinctorial strength and brilliance by precipitating the color compound from acid solution of the same by drowning in aqueous solutions in a state of turbulent flow whereby the time of dilution of the acid solution may be reduced to a minimum and crystal growth prevented, or carefully controlled.

It is a further object of the invention to provide a method for precipitating organic pigments such as phthalocyanines, and vat colors from acid solutions of the same by introducing the acid solution of the color compound into an aqueous solution in turbulent flow by passing the acid solution of the color compound into an aqueous solution flowing through a conduit at a velocity greater than the critical velocity.

We have found that where the acid solution of a color compound, such as the phthalocyanines, vat dyestuffs, or other colors soluble in concentrated sulfuric acid, is introduced into water which is in a state of turbulent flow, the time required to precipitate out the water insoluble color and to dilute it beyond the point where crystal growth takes place is so short that the resulting dyestuff or pigment is retained in an extremely fine state of sub-division, materially finer than that obtained by the known methods of drowning, and which when employed as pigments exhibit improved brilliance and strength as compared with the product of the prior art.

By turbulent flow as used in this specification and claims we refer to that motion of a liquid such as is induced upon it in flowing through a pipe at a velocity greater than its critical velocity and which is characterized by the presence of innumerable eddy currents, as distinguished from the straight line or laminar flow where the liquid although induced to rotate under agitation in currents still flows for an appreciable time without interruption.

In "Principles of Chemical Engineering" by Walker, Lewis and McAdams, second ed. (1927) pgs. 73–77, at page 74, it is pointed out that in the case of every fluid flowing through a tube, as the velocity is increased, some point is reached where the type of motion suddenly changes from straight line motion to a second type of motion known as turbulent motion, which is characterized by the presence of innumerable eddy currents in the stream. On page 75 of the same text, "Critical velocity" is defined as the velocity at which the type of motion changes from straight line to turbulent flow.

Because of the innumerable eddy currents which characterize turbulent flow, the acid flowing into the water in a state of turbulent flow is instantaneously diluted to a point where crystal growth is retarded or prevented, while in the usual drowning of acid solutions of color compounds where the acid solution is run into the water, under the ordinary types of agitation the drops or even much smaller globules of the acid solution are carried in the current of water created by the agitator for an appreciable length of time before they are dispersed or diffused to a point where crystal growth no longer occurs. With the ordinary agitation employed in plants or laboratories the mass of the liquid in the usual drowning tubs or laboratory type vessels is merely rotated in the vessel with practically no eddy currents being set up. Even with high speed agitation in the usual drowning equipment the mass of the liquid is still flowing in currents under what is generally considered as laminar flow for only at certain points within the vessel are the cross-currents contacting each other under conditions which would give a state of agitation, which however does not compare with the turbulence of the type above defined.

The ratio of water to acid solution at the moment of drowning may be varied widely, the upper limit being determined by the amount of pigment suspension that can be economically handled while the lower limit will be the acid concentration at which the given pigment is completely out of solution, and in which no further crystal growth takes place. The drowning in the turbulent flow may be effected in the minimum amount of water required to fix the crystal size and the resulting dilute acid suspension of the pigment may be further diluted in any apparatus desired prior to filtering, or the ultimate dilution desired may be effected in the turbulence tube and the suspension run directly to the filter, thus saving the space and cost incident to the use of large drowning tubs. By drowning to as low as 1% acid concentration and filtering directly, much of the time heretofore required for washing the cake can be eliminated. In the conventional drowning acid concentrations of less than 10% are impractical because of the extremely large volumes required for the drowning tubs. If desired, the drowning water may be drawn continuously from a drowning vessel and circulated through the drowning tube (turbulence tube) back into the vessel.

The acid solution of the color may be introduced into any tube in which turbulence exists either counter-current, co-current or at any other angle with the flow of the diluting liquid.

The drowning medium may be water, dilute acids, solutions of inorganic salts or of organic compounds in which the acids used for dissolving the pigments are soluble and in which the pigments are insoluble. The drowning may be carried out at temperatures ranging from the freezing point to the boiling point of the drowning mixture. The temperatures employed being dependent upon the solubility or stability of the particular color under consideration.

Any water insoluble organic pigment that is soluble in the usual acid-pasting acids, such as oleum, sulfuric acid, chlorosulfonic acid, ethylsulfuric acid, phosphoric acid, paratoluene-sulfonic acid, etc., may be crystallized out in fine form by drowning according to this process.

The concentration of acid used to dissolve the pigment is unimportant provided the pigment is in complete solution. The ratio of concentrated acid to pigment may also be varied, the lower limit being governed by the solubility of the pigment.

It will be obvious to those skilled in the art that turbulent flow of the diluting liquid of the type required to give the results obtained by a turbulence tube may be created in other ways. The acid solution of the color may be introduced into a centrifugal or impeller type pump, which becomes merely a modified turbulent flow tube due to the flow of the liquid through or by the impeller tubes or vanes. Turbulent flow may also be produced by means of a high speed propeller operating in a confined space or in a very limited amount of liquid. In each case the turbulent flow may be considered as being produced when the flow of the liquid relative to the surface over which it is flowing is greater than the critical velocity. Where an agitator is revolved, even in a large volume of liquid at a speed relative to the liquid greater than what might be considered the critical velocity a point will be reached where the liquid adjacent the agitator is no longer in laminar flow over the propeller, but is thrown into innumerable eddy currents in that restricted area although the mass of the liquid is rotating in currents of appreciable magnitude throughout the rest of the vessel. Where the acid solution of the color is introduced directly into such an area of turbulent flow quick dilution may be effected so that crystal growth is prevented. The area of turbulent flow must of course contain sufficient of the diluting liquid relative to the amount of acid solution being introduced to completely precipitate the color and bring the acid to a dilution in which the crystals will not grow.

Turbulent flow or turbulent flow as referred to herein is to be distinguished from agitation in which air is incorporated with the liquid to cause a foam, froth or aerated mass which appears to be in a state of high agitation.

The diameter of the turbulent flow tube may be of any size desired or found necessary for the particular volumes of liquid to be handled. Since the dilution at the point the concentrated acid solution of the color is introduced is substantially instantaneous the length of the tube beyond the acid inlet is immaterial, so long as turbulent flow exists for the interval of time required for dilution of the acid below the point at which crystal growth takes place. To increase the velocity of flow of the diluting liquid at the point of addition of the acid a constriction may be employed if desired, although this is not necessary. The acid inlet may be placed at the inlet, or at the outlet end of the constriction or at a point intermediate in its length, and it may or may not be placed co-axially with the tube or restricted portion. The comparative sizes of the acid inlet and turbulent flow tube into which it opens will depend upon the degree of dilution desired and may be varied over wide limits. Ratios of volumes of diluting water to acid from 6 to 1 to 100 to 1 have been found to give good results, although it will be obvious that a smaller ratio may be employed if the color is sufficiently insoluble in such dilutions that no objectionable crystal growth takes place.

While velocities of the drowning liquid through the turbulent flow tube only slightly in excess of the critical velocity give pigments of colloidal dimensions which are much finer than those obtained by the usual drowning methods, the particle size may be still further decreased by increasing the velocity of flow. This method of drowing therefore permits of more accurate control of the particle size than previously known methods. It also gives a uniformity of particle size that cannot be approached by the usual drowning methods for all of the acid solution of the color is diluted under identical conditions, whereas in ordinary drowning the acid falls into water under varying degrees of agitation.

The following examples are given to illustrate the invention. The parts used are by weight unless otherwise designated.

*Example 1*

Sixty parts of the red vat color, N,N'-diethyl-2,2'-dipyrazolanthronyl, are dissolved in 600 parts of 98% sulfuric acid. After the color is completely in solution, the charge is divided into two equal parts. The one part designated as (A) is drowned in 3000 parts of water at 90°–95° C., by adding the acid solution to the water in several small streams with good agitation. The other part, designated as (B) is introduced into the center of a stream of water flowing through a constricted tube in a state of turbulent flow, that is at a velocity above the critical velocity for the tube or pipe used. The acid is introduced through a small pipe located at the center line of the larger tube and parallel to it, extending through the constriction and ending at the point where the outside pipe resumed its original size. The acid is run into the water in the same direction of flow. The velocity of the water is maintained above the critical velocity for the diameter of pipe used, and the charge is thus drowned at 25°–30° C., at a water-acid ratio of 30 to 1. While it will be noted that the temperature and amount of water used in (B) is different from that used in (A), the drowning conditions employed in (A) are chosen because they represent the optimum acid-pasting conditions, known heretofore in the conventional acid-pasting of this color.

Both (A) and (B) are filtered and washed acid-free. When the nutsch cakes are dried, ground into a linseed oil varnish, and compared with each other, the (B) sample is found to be much darker in masstone, much yellower, much brighter and stronger than the (A) sample.

*Example 2*

Fifty parts of mono-chlorinated indanthrone are dissolved in 500 parts of 98% sulfuric acid. When the pigment is completely in solution, the charge is divided into two equal parts. One part (A) is added slowly to 2500 parts of water at 85°–95° C. under agitation. The other part, (B) is drowned by passing the acid solution into water in turbulent flow downward through a tube ten inches long and ½ inch in diameter having a constriction to ¼ inch about two inches from the outlet end of the tube, the acid inlet being a pipe having a $\frac{1}{16}$ inch opening which was arranged co-axially in the turbulence tube and extending through and discharging at the outlet side of the constriction. The flow of the diluting liquid is at the rate of from 12 to 15 feet per second through the constriction. The temperature is maintained at 77°–82° C. and the water-acid ratio is maintained at 30 to 1. Both (A) and (B) are finished and tested in a manner similar to that described in Example 1. The (B) sample is found to be lighter in masstone, redder and much stronger than the (A) sample.

*Example 3*

Fifty parts of flavanthrone are dissolved in 500 parts of 98% sulfuric acid. The acid solutions are divided into two equal parts, the one part (A) being drowned in 2500 parts of water under agitation at 30°–40° C. The acid is added slowly from several small outlets. The other part (B) is drowned in a manner described for the (B) sample in Example 1. The temperature is maintained about 30° C., with a water to acid ratio of 30 to 1. Both (A) and (B) samples are filtered and washed acid-free. The nutsch cakes are treated with dilute hypochlorite solution, filtered and washed alkali-free. When dried and ground in linseed oil varnish, the (B) sample is found to be very brown in masstone, very red and bright and much stronger than the (A) sample.

*Example 4*

Fifty parts of indanthrone are dissolved in 500 parts of 98% sulfuric acid. This solution is divided into two equal parts which are diluted in the same manner as described in Example 3 except that in both cases the drownings are carried out at 80°–90° C. In this case the (B) sample is very light in masstone, redder, brighter and much stronger than the (A) sample.

*Example 5*

Sixty parts of copper phthalocyanine (see B. P. 410,814, Example 3) are dissolved in 600 parts of 98% sulfuric acid. When the pigment is in solution, the charge is divided into two parts, one part (A) being added in several small streams to 3000 parts of water under good agitation at 25°–30° C. The other part (B) is drowned in a tube or pipe similar to that described under (B) in Example 1. Both (A) and (B) samples are filtered, washed acid-free and the nutsch cakes reslurried with dilute ammonia. The charges again are filtered and washed alkali-free. When dried and ground in linseed oil varnish, the (B) sample is found to be very dark or jet in masstone, redder, brighter and stronger than the (A) sample. Substantially the same results are obtained in the turbulent tube drowning when the acid-water ratio is varied anywhere from 1:10 to 1:100.

*Example 6*

Where the above example is repeated, except the drowning of both samples was carried out at 95°–100° C., again the (B) sample is darker in masstone, redder, brighter and stronger than the (A) sample.

*Example 7*

Sixty parts of "Sulfanthrene" Orange R, Color Index No. 1217, are added to 600 parts of sulfuric acid monohydrate. After the color is in solution, the charge is drowned in two parts in a manner similar to that described in Example 1, at a temperature of 90°–95° C. for both parts. When the (B) sample is dried and ground in linseed oil varnish, it is darker in massstone, very red, very bright and much stronger than the (A) sample.

*Example 8*

Where Example 7 is repeated using "Sulfanthrene" Red 3B, Color Index No. 1212. The (B) sample is redder in masstone, very yellow in shade and much stronger than the (A) sample.

*Example 9*

One hundred fifty parts of copper phthalocyanine are dissolved in 1500 parts of 98% sulfuric acid. One-half of the acid solution is added to 7500 parts of water under agitation in several fine streams, with good agitation. The other part of the acid solution is introduced directly into an impeller type pump instead of the tube as described in Example 1. Both charges are drowned at 25°–30° C. Here again, the sample drowned in the pump is much darker in masstone, brighter and much stronger than the sample drowned in the conventional manner.

Example 10

50 parts of the brown dye, 2,1-naphth-thio-indigo, are dissolved in 1250 parts of 98% sulfuric acid at 5° C. by stirring overnight. When drowned in the apparatus described in Example (1B) with the water at 3° C., there is a temperature rise of 5° C. and the solution contains 3.1% sulfuric acid. The resulting color suspension is filtered and washed, and compared with a control experiment prepared by drowning a similarly prepared solution of the color by slow addition to well agitated water.

The color prepared by the method of this invention is found to be much stronger and brighter in shade than the control preparation when applied in the form of a pigmented printing ink emulsion on textiles.

Example 11

50 parts of the red dye, consisting of a chlorinated anthraquinone benzacridone, are dissolved in 500 parts of 98% sulfuric acid below 50° C. and drowned at a uniform rate in water at 90° C. in the apparatus described in Example (1B). The temperature of the solution leaving the tube is 92° C. and contains 3.8% sulfuric acid. After filtering and washing acid-free the resulting stiff color paste is thinned by the addition of a small amount of the formaldehyde condensation product of naphthalene sulfonic acid and incorporated in emulsion type printing inks. The prints obtained therefrom are much stronger and brighter than those obtained from a control preparation which is treated in the same manner except that its sulfuric acid solution was drowned by slow addition to well agitated water.

Example 12

Sixty parts of disodium phthalocyanine (described in B. P. 410,814 and U. S. P. 2,116,602) are dissolved in 600 parts of 98% sulfuric acid at 0° C. Upon complete solution of the color, the charge is divided into two parts, one-half (A) being drowned by adding the acid solution to 3000 parts of water at 25–30° C. under agitation. The other half of the charge (B) is drowned through the tube as described in Example 1. Both parts are filtered, washed acid-free and dried. When the metal-free phthalocyanine thus obtained is ground in linseed oil, the (B) sample is darker in masstone, very bright and very strong versus the (A) sample.

Example 13

Sixty parts of aluminum phthalocyanine are acid-pasted and drowned in a turbulent flow tube in the same manner as described in Example 1. When ground in linseed oil varnish, the tube drowned sample exhibits greater brightness and strength than that drowned in the conventional manner.

Example 14

Sixty parts of copper phthalocyanine is dissolved in 600 parts of anhydrous phosphoric acid at 90°–100° C. The charge is divided into two parts which are drowned in the same manner as described in Example 1, except that both parts of the charge are drowned at 95°–100° C. When ground in linseed oil varnish, the tube drowned sample is superior to the product prepared by the conventional method in both brilliancy and strength.

Example 15

Sixty parts of hexa-decachloro-copper phthalocyanine (as described in B. P. 478,256—Dent & Sylvester 1, Ser. No. 152,274) are dissolved in 600 parts of a 3 to 1 mixture of sulfuric acid monohydrate and chlorosulfonic acid. The charge is divided into two parts and drowned in the same manner as described in Example 1, except that both parts are drowned at 25–30° C. When ground in linseed oil varnish, the tube drowned sample is darker in masstone, bluer, brighter and stronger than the sample drowned in the conventional manner.

Example 16

404 parts of crude copper phthalocyanine containing anhydrous sodium sulfate, equivalent to 120 parts of copper phthalocyanine, 100%, are dissolved in 2100 parts of 98% sulfuric acid. When completely dissolved the acid solution is drowned in water at 95–98° C. by passing the acid solution into water in a state of turbulent flow through a one inch pipe 19 inches long, the acid inlet pipe being arranged co-axially therewith and extending into the one inch pipe in the direction of flow of the diluting water five inches. The internal diameter of the acid inlet pipe being ¼ inch and the ratio of volumes of flow of diluting liquid:acid is 30:1. This drowning operation is carried out by circulating the water, and dilute acid as it was produced, through the turbulent flow pipe from the drowning vessel. When the drowning operation is completed the resulting pigment is filtered off, dried and ground in linseed oil varnish. It is darker in masstone, redder, brighter and stronger in tint than when drowned at the same temperature by conventional methods.

We claim:

1. In the process for preparing organic color compounds in an extremely finely divided form, the step which comprises drowning an acid solution of said organic color compound in an aqueous solution in which the color compound is insoluble, by introducing the acid solution of the color into the aqueous solution in an area where the aqueous solution is in a state of turbulent flow and where no laminar flow exists.

2. In the process for preparing water insoluble organic pigments in an extremely finely divided form, the step which comprises drowning an acid solution of the water insoluble organic color compound in water which is in a state of turbulent flow and in which no laminar flow exists.

3. In the process for preparing phthalocyanine pigments in an extremely finely divided form, the step which comprises drowning an acid solution of the phthalocyanine color in water which is in a state of turbulent flow and in which no laminar flow exists.

4. In the process for preparing vat dyestuffs in an extremely finely divided form, the step which comprises drowning an acid solution of the vat color in water which is in a state of turbulent flow and in which no laminar flow exists.

5. In the process for preparing anthraquinone vat dyestuffs in an extremely finely divided form, the step which comprises drowning an acid solution of the anthraquinone color compound in water which is in a state of turbulent flow and in which no laminar flow exists.

6. In the process for preparing thioindigo vat dyestuffs in an extremely finely divided form, the step which comprises drowning an acid solution of the thioindigo color compound in water which is in a state of turbulent flow and in which no laminar flow exists.

7. Finely divided organic pigment colors which have been precipitated by the process of claim 12 and which exhibit increased strength and brilliance over the same colors that have been precipitated by the conventional drowning methods.

8. Phthalocyanine pigments which have been precipitated by the process of claim 13 and which exhibit increased strength and brilliance over the same colors that have been precipitated by the conventional drowning methods.

9. Vat dyestuffs in a very finely divided form which have been precipitated by the process of claim 14 and which when employed as pigments exhibit increased strength and brilliance over the same colors that have been precipitated by the conventional drowning methods.

10. Thioindigoid dyestuffs in a very finely divided form which have been precipitated by the process of claim 15 and which when employed as pigments exhibit increased strength and brilliance over the same colors that have been precipitated by the conventional drowning methods.

11. A copper phthalocyanine pigment which has been precipitated by the process of claim 3 which when ground in a paint vehicle is very dark or jet in mass tone, redder, brighter and stronger than the same color when precipitated from acid solution by conventional drowning methods.

12. In the process for preparing water insoluble organic pigments in an extremely finely divided form, the step which comprises drowning an acid solution of the water insoluble organic color compound by introducing said acid solution into an aqueous solution in which the color compound is insoluble while said aqueous solution is passing through a tube at a speed greater than its critical velocity and in the state of turbulent flow.

13. In the process for preparing phthalocyanine pigments in an extremely finely divided form, the step which comprises drowning an acid solution of the phthalocyanine color by introducing said acid solution into an aqueous solution in which the color compound is insoluble while said aqueous solution is passing through a tube at a speed greater than its critical velocity and in the state of turbulent flow.

14. In the process for preparing vat dyestuffs in an extremely finely divided form the step which comprises drowning an acid solution of the water insoluble vat dyestuff by introducing said acid solution into an aqueous solution in which the dyestuff is insoluble while said aqueous solution is passing through a tube at a speed greater than its critical velocity and in a state of turbulent flow.

15. In the process for preparing thioindigo vat dyestuffs in an extremely finely divided form, the step which comprises drowning an acid solution of the water insoluble dyestuff by introducing said acid solution into an aqueous solution in which the dyestuff is insoluble while said aqueous solution is passing through a tube at a speed greater than its critical velocity and in the state of turbulent flow.

STANLEY R. DETRICK.
CARL R. BRANDT.